(12) United States Patent
Satoh et al.

(10) Patent No.: US 7,004,417 B2
(45) Date of Patent: Feb. 28, 2006

(54) TAPE CARTRIDGE

(75) Inventors: Takateru Satoh, Tokyo (JP); Akio Momoi, Tokyo (JP); Hiroki Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/614,875

(22) Filed: Jul. 7, 2003

(65) Prior Publication Data

US 2004/0104294 A1 Jun. 3, 2004

(30) Foreign Application Priority Data

Jul. 5, 2002 (JP) .............................. 2002-196715

(51) Int. Cl.
*G11B 23/04* (2006.01)
(52) U.S. Cl. .................... 242/338.1; 212/348; 360/132
(58) Field of Classification Search ................ 360/132; 242/348, 343, 338.3, 338.1
See application file for complete search history.

(56) References Cited

U.S. PATENT DOCUMENTS 6,271,991 B1 * 8/2001 Saliba et al. ................ 360/132

FOREIGN PATENT DOCUMENTS

JP    2002-083481    3/2002

OTHER PUBLICATIONS

Patent Abstracts of Japan for JP2002-083481 published on Mar. 22, 2002.

* cited by examiner

*Primary Examiner*—John Q. Nguyen
(74) *Attorney, Agent, or Firm*—Darby & Darby

(57) ABSTRACT

This tape cartridge is provided with a tape reel being rotatable and having a reel teeth portion; and a brake-locking member having a brake teeth portion in which mating operation and mate-releasing operation can be performed with respect to the reel teeth portion. The reel teeth portion and the brake teeth portion, each has plural teeth. Each of the teeth has a taper portion being inclined toward both sides from a tip part of the taper portion and a vertical portion extending in a substantially vertical manner from both end terminals of the taper portion to a base portion. At the time of the mating, the tip part is contacted with a bottom surface of the base portion at the side of the opposite teeth, and the vertical portion is opposed to the vertical portion at the side of the opposite teeth. At the time of mating, the vertical portions of the teeth are mutually contacted and the mating state is hard to become unfitted. Additionally, height of the teeth can be low and a gap between the teeth can be wide when the cartridge is used, so that contact between the teeth can be prevented.

14 Claims, 12 Drawing Sheets

FIG. 7
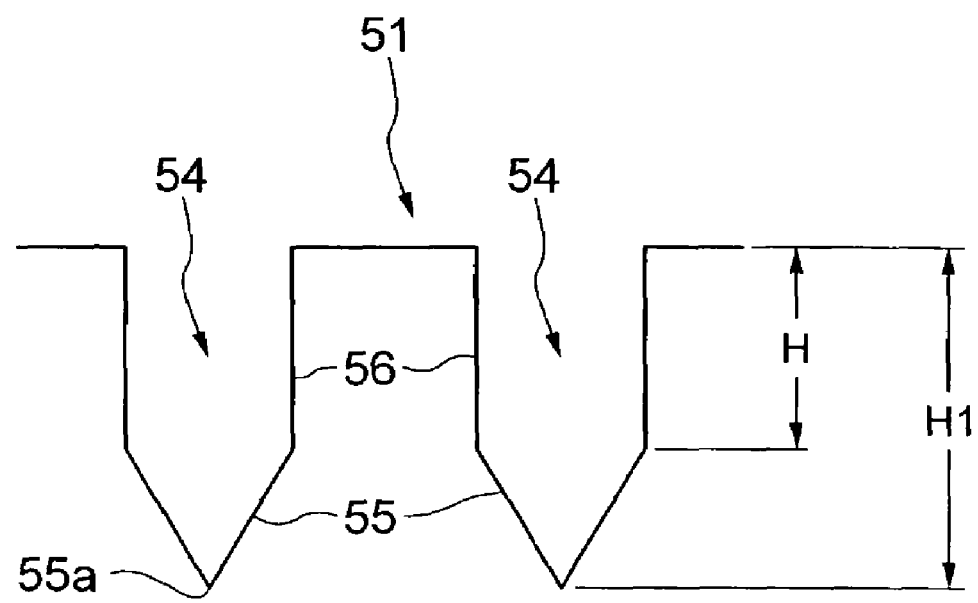
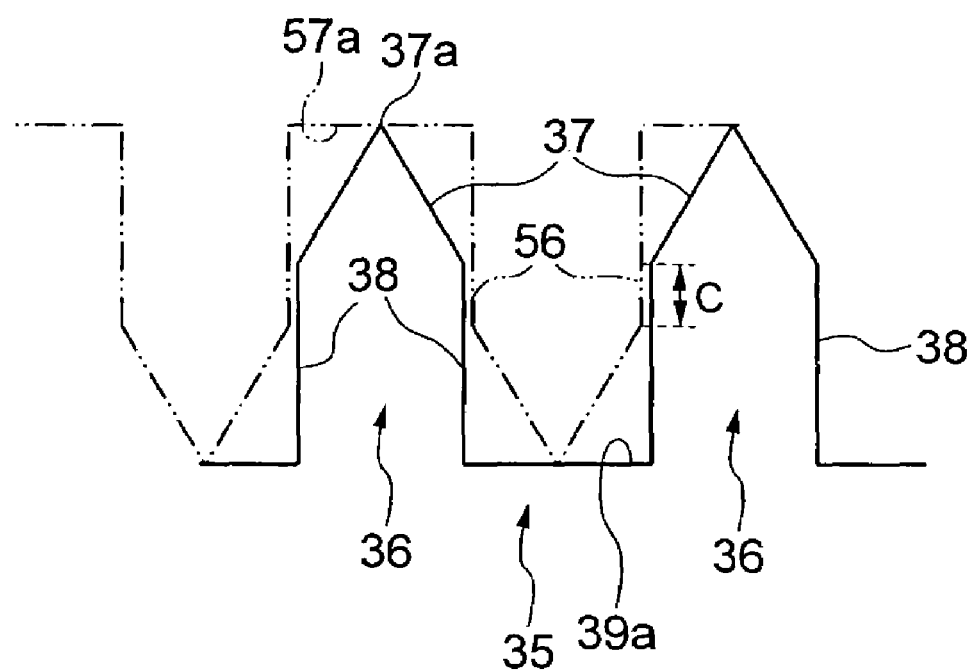

FIG. 8
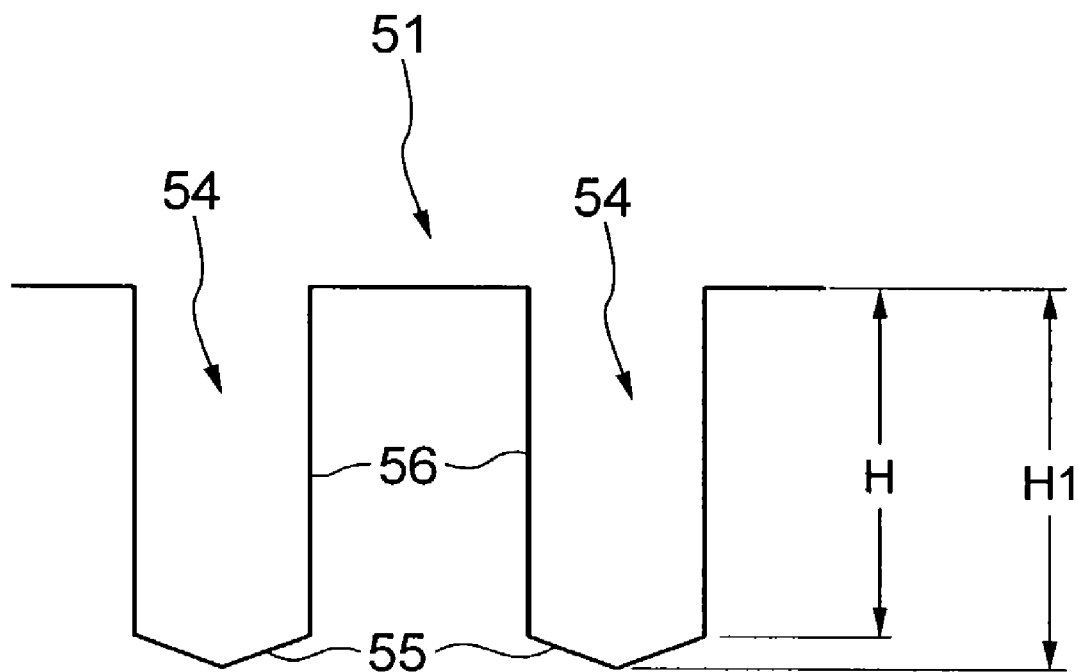
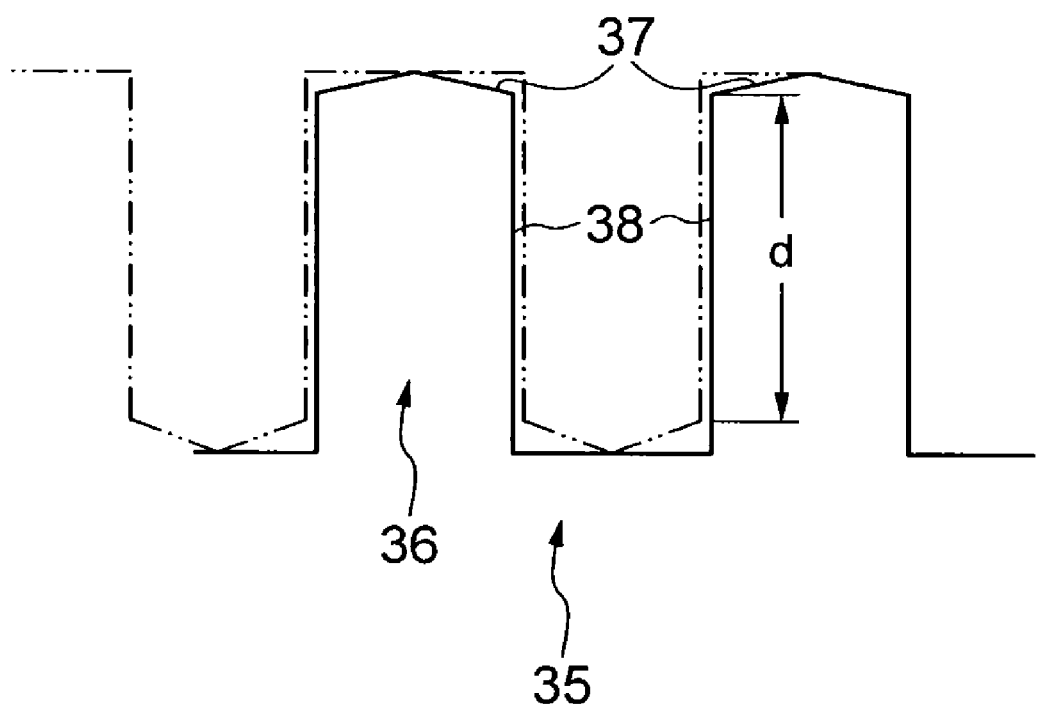

TAPE CARTRIDGE

BACKGROUND OF THE INVENTION

1. Field of the Invention

The present invention relates to a reel-typed tape cartridge used for a magnetic recording and reproducing apparatus.

2. Description of the Prior Art

A reel-typed tape cartridge used for a magnetic recording and reproducing apparatus is provided with a brake-locking member for preventing a tape reel from being rotated in order to maintain a braked state when the tape cartridge is not used. FIG. 10 is a vertical sectional view of a conventional one-reel typed tape cartridge. A tape cartridge 100 in FIG. 10 is produced so as to prevent the tape from being loosened as follows. A brake-locking member 103 biases a teeth portion 103a using a spring 101 in a direction of an arrow A in FIG. 10, in which a teeth portion 103a of the brake-locking member 103 is mated with a teeth portion 104 being connected to an inner surface side of a hub 102a of a tape reel 102, resulting in that rotation of the tape reel 102 is prevented when the tape cartridge is not used, e.g. when the tape cartridge 100 is preserved, and further the rotation of the tape reel 102 owing to unexpected vibration or the like when the tape cartridge 100 is preserved and the loosening of the tape owing the rotation thereof is prevented. Further, when the tape cartridge 100 is used, a brake-releasing plate 105 is pushed up, thereby lifting the brake-locking member 103 upwardly in FIG. 10 against a biasing force using the spring 101, releasing the mating state between the teeth portion 103a and the teeth portion 104, resulting in performing lock-releasing operation.

FIG. 11A is a partial front view showing a state where the teeth portion 104 at the side of the tape reel 102 is mated with the teeth portion 103a of the brake-locking member 103. FIG. 11B is a partial front view showing a state where the mating state is released. As shown in FIG. 11A, the teeth portion 104 and the teeth portion 103a, both are shaped in an elongated triangle teeth manner, and the teeth of them are mutually mated therewith.

However, according to such a conventional teeth-mating configuration as shown in FIG. 11A, the teeth and the opposite teeth is obliquely contacted, so that when a force is worked from outside owing to vibration or the like, the mating between the teeth and the opposite teeth is unfitted, resulting in that the tape reel 102 is unexpectedly rotated, and the tape becomes readily to be loosened when the tape cartridge is not used e.g. when the tape cartridge is preserved. Thus, if a function for preventing the tape from being loosened is not sufficiently operated and the tape is loosened at an inside of the cartridge case, then the tape will be readily folded and/or jammed.

In order to prevent the tape from being loosened, the teeth are made to be longer and the teeth and the opposite teeth have only to be deeply mated. However, in this case, following working will occur. By pushing up the brake releasing plate 105, the brake-locking member 103 is moved when the tape cartridge is used. Thereby, when the teeth portion 103a of the brake-locking member 103 is detached from the teeth portion 104 at the side of the tape reel 102 as shown in FIG. 11B so that the mating state is released, the gap a becomes narrower between the teeth portion 103a and the teeth portion 104, because the stroke for the releasing is constant while the above-mentioned teeth are long in themselves.

Here, even when the gap a becomes narrower, if the gap a is always kept be constant, there will not occur any big problem. In fact, the brake-locking member 103 is biased against the brake releasing plate 105 using the spring 101 supported by the cartridge case, and the brake-locking member 103 is contacted with the brake releasing plate 105 at a bearing portion 101a whose center portion is convex. Thus, if a pressure balance of the spring 101 is not kept, then the brake-locking member 103 will be inclined. Further, the teeth portion 103a of the brake-locking member 103 is in contacted with the teeth portion 104 of the rotating tape reel 102, because the gap a is originally narrow. Thus, such a configuration might cause an erroneous operation.

Additionally, the bearing portion 101a located at a center of the brake-locking member 103 is rotated and contacted with the brake releasing plate 105 and biased using the spring 101 to receive a pressure. Thus, if a using time of the tape cartridge passes to some extent, the bearing portion 101a may be sometimes worn. The gap a in FIG. 11B becomes narrower owing to such wearing defect, so that the teeth portion 103a is contacted with the teeth portion 104 of the rotating tape reel 102. Thus, in such a same way as above-mentioned, such a configuration might readily cause an erroneous operation.

SUMMARY OF THE INVENTION

The object of the present invention is to provide a tape cartridge in which the mating state of teeth at the side of a brake-locking member with teeth at the side of a tape reel is hard to become unfitted when the tape cartridge is not used, the unexpected rotation of the tape reel can be securely prevented, the loosening of the tape is hard to occur, and the strength of the teeth is enhanced.

Another object of the present invention is to provide a tape cartridge in which a gap between the teeth at the side of the tape reel and the teeth at the side of the brake-locking member when the tape cartridge is used can be secured as wide as possible, resulting in that the contact between the teeth at the side of the tape reel and the teeth at the side of the brake-locking member is prevented while the tape reel is rotating, so that an error operation can be prevented.

A tape cartridge according to the present embodiments is constituted so that the tape cartridge comprises: a tape reel around which a tape-shaped recording medium is wound, which is rotatably housed, and which has a reel teeth portion; and a brake-locking member having a brake teeth portion capable of being mated with the reel teeth and releasing the mating state so that rotation of the tape reel is prevented when the tape cartridge is not used and is possible when the tape cartridge is used; wherein the reel teeth portion and the brake teeth portion respectively have a plurality of teeth projected from a base portion, each of the teeth have a taper portion which is inclined toward at least one direction from a tip part of the teeth, and vertical portions extending in a substantially vertical manner from an end terminal and the tip part of the taper portion or from both end terminals of the taper portion to the base portion; and at least one portion of each of the teeth is constituted so that the vertical portion is opposing to the vertical portion at an opposite side at the time of the mating.

According to this tape cartridge, each tooth of the reel teeth portion and the brake teeth portion have a vertical portion extending in a substantially vertical manner from an end terminal and the tip part of the taper portion or from both terminals of the taper portion to the base portion; and at least one portion of each of the teeth is constituted so that the vertical portion is opposing to the vertical portion at an opposite side at the time of the mating. Consequently, when the tape cartridge is not used, the mating state of the teeth at the side of the brake-locking member with the teeth at the side of the tape reel becomes hard to be unfitted, the unexpected rotation of the tape reel is securely prevented, the loosening of the tape is hard to occur, and a sectional area of each of the teeth by the taper portion and the vertical portion can be securely large, resulting in that strength of the teeth can be enhanced. Further, when the teeth and the opposite teeth are about to be mutually mated, the tip part of each of the teeth is guided and moved using the taper portion, resulting in that the mating of the teeth with the opposite teeth can be readily and securely performed.

A configuration of each of the teeth is explained as follows. The taper portion may be inclined at both sides from the tip part and further the vertical portions at both sides may be extended from both end terminals of the taper portion to the base portion. Further, the taper portion is inclined toward one of the both sides of the tip part, one of the vertical portions is extended from the end terminal of the taper portion to the base portion, and the other one of the vertical portions is extended from the tip part to the base portion. The tip part of each of the teeth is constituted at its apex or a flat portion.

Further, the tape reel and the brake-locking member are constituted so that they are relatively moved so as to have a gap between the reel teeth portion and the brake teeth portion in order to release the mating state. In such a configuration, as above-mentioned, when the tape cartridge is not used, the teeth at the side of the brake-locking member and the teeth at the side of the tape reel become hard to be unfitted and a sectional area of the tooth can be securely large, resulting in that a gap between the reel teeth portion and the brake teeth portion can be securely large, and contact between the reel teeth portion and the brake teeth portion can be securely prevented while the tape reel is rotating, so that an error operation can be prevented when the tape cartridge is used. Thereby, reliability can be enhanced when the tape cartridge is used.

Further, it is preferable that the tape cartridge is provided with a biasing member which biases the brake-locking member for establishing the mating state, and an engaging portion which is engaged with a driving member of an external device for rotational driving of the tape reel when the tape cartridge is used, in which the brake-locking member is moved against a biasing force of the biasing member when the driving member is engaged with the engaging portion. Thereby, when the tape cartridge is mounted to the exterior device in order to use the tape cartridge, the driving member is engaged with the engaging portion at the side of the tape cartridge thereby moving the brake-locking member, resulting in that the mating state of the reel teeth portion with the brake teeth portion can be released.

Further, the tape cartridge can be constituted so that the end portion at the side of the tape reel of the brake-locking member is abutted on a rotating portion integrally with the tape reel at the vicinity of the rotating center portion of the tape reel. Thereby, even if the abutting portion is worn while the tape cartridge is being used, as above-mentioned, the gap between the reel teeth portion and the brake teeth portion can be widely secured when the tape cartridge is used, allowance degree becomes greater with respect to an worn amount.

Further, the tape cartridge can be constituted so that the tip part is contacted with a bottom surface of the base portion of the opposite side at the time of the mating. In this case, provided that height of each of said teeth from said base portion to the tip part is defined by H1, height of the vertical portion H (distance from the base portion to the terminal end of the taper portion) is satisfied by following equation:

$$0.6 \times H1 \leq H \leq 0.95 \times H1 \quad (1)$$

The height H of the vertical portion is set to be equal to or 60% higher than the height (entire height) H1 from the base portion of the teeth portion to the tip part. Thereby, opposing areas between the vertical portions can be secured at the time of the mating. Further, the height H is equal to H1 or 95% lower than H1. Thereby, an inclination angle can be secured to such an extend that the guide effect can be performed at the taper portion.

Further, the tape cartridge can be constituted so that the vertical portion is contacted with the vertical portion at the opposite side so that the tip part is not contacted with a bottom surface of the base portion at the opposite side at the time of mating. In this case, The tape cartridge is constituted so that, provided that height from the base portion to the tip part is defined by H1, a contact height $\Delta H$ at a mutually contacting portion between the vertical portions is satisfied with following equation:

$$0.2 \times H1 \leq \Delta H \leq 0.9 \times H1 \quad (2)$$

The contact height $\Delta H$ at a mutually contacting portion between the vertical portions is set to be equal to or 20% higher than H1. Thereby, the contact height $\Delta H$ at a mutually opposing and contacting portion between the vertical portions is set to be equal to or 20% higher than the height (entire height) from the base portion of the teeth portion to the tip part, resulting in that the mutually opposing contact areas at the time of the mating can be secured. Further, the contact height $\Delta H$ is set to be equal to or 90% lower than the height (entire height), resulting in that an inclination angle can be secured to such an extent that the guide effect can be performed at the taper portion.

Additionally, it is preferable that the reel teeth portion and the brake teeth portion are constituted so that a plurality of the teeth are arranged in a circular manner by a constant pitch having a constant angle with relative to its center.

BRIEF DESCRIPTION OF DRAWINGS

FIG. 7 is an elevational view showing a modified example of a teeth construction in which a height H at a vertical portion of each of the teeth is set so as to be somewhat lower in a same way as shown in FIG. 5.

FIG. 8 is an elevational view showing another modified example of a teeth construction in which a height H at a vertical portion of each of the teeth is set so as to be somewhat higher in a same way as shown in FIG. 5.

DETAILED DESCRIPTION OF THE PREFERRED EMBODIMENTS

Figure 1:
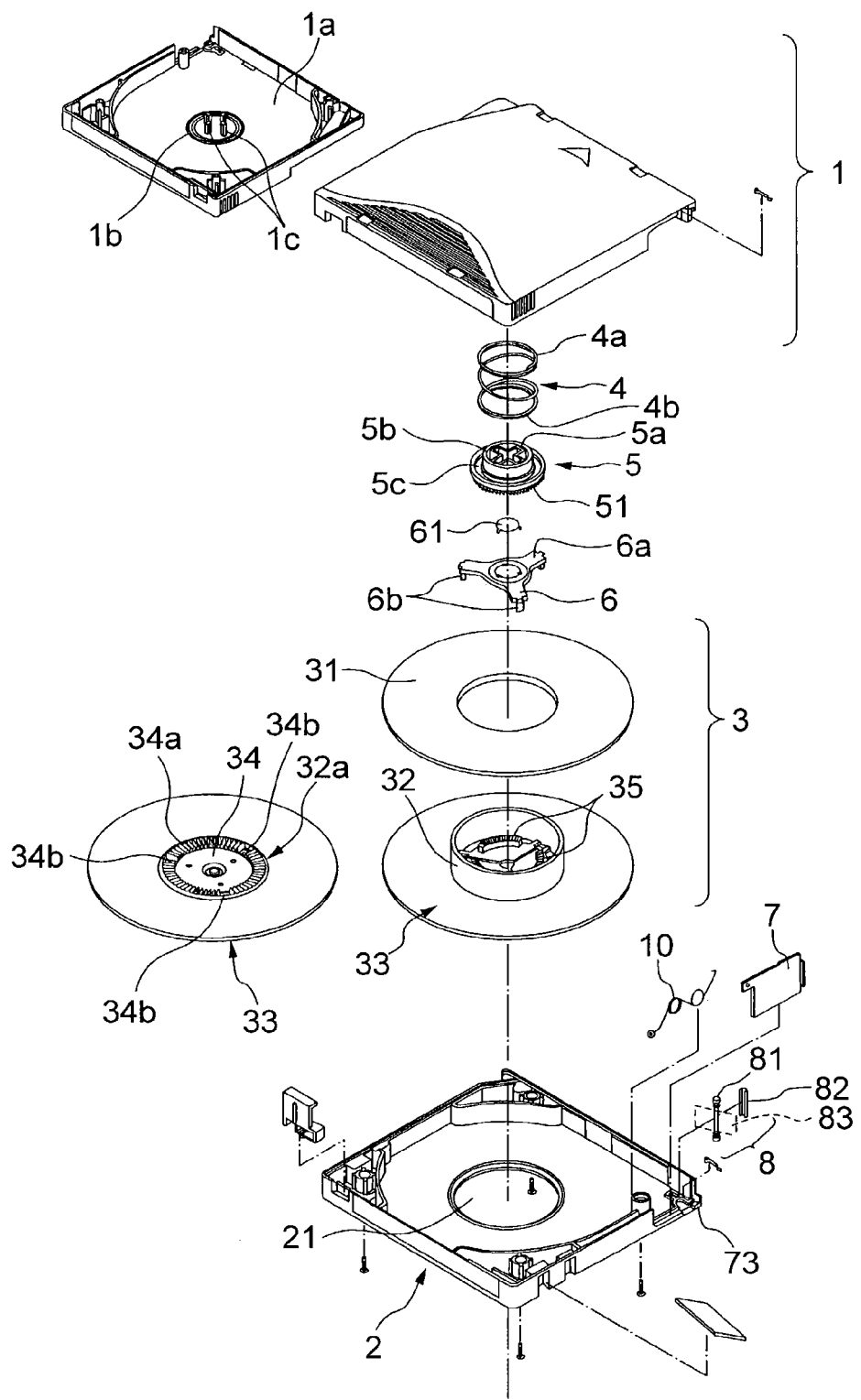
FIG. 1 is an exploded view in perspective of a tape cartridge according to an aspect of the present invention.
Figure 2:
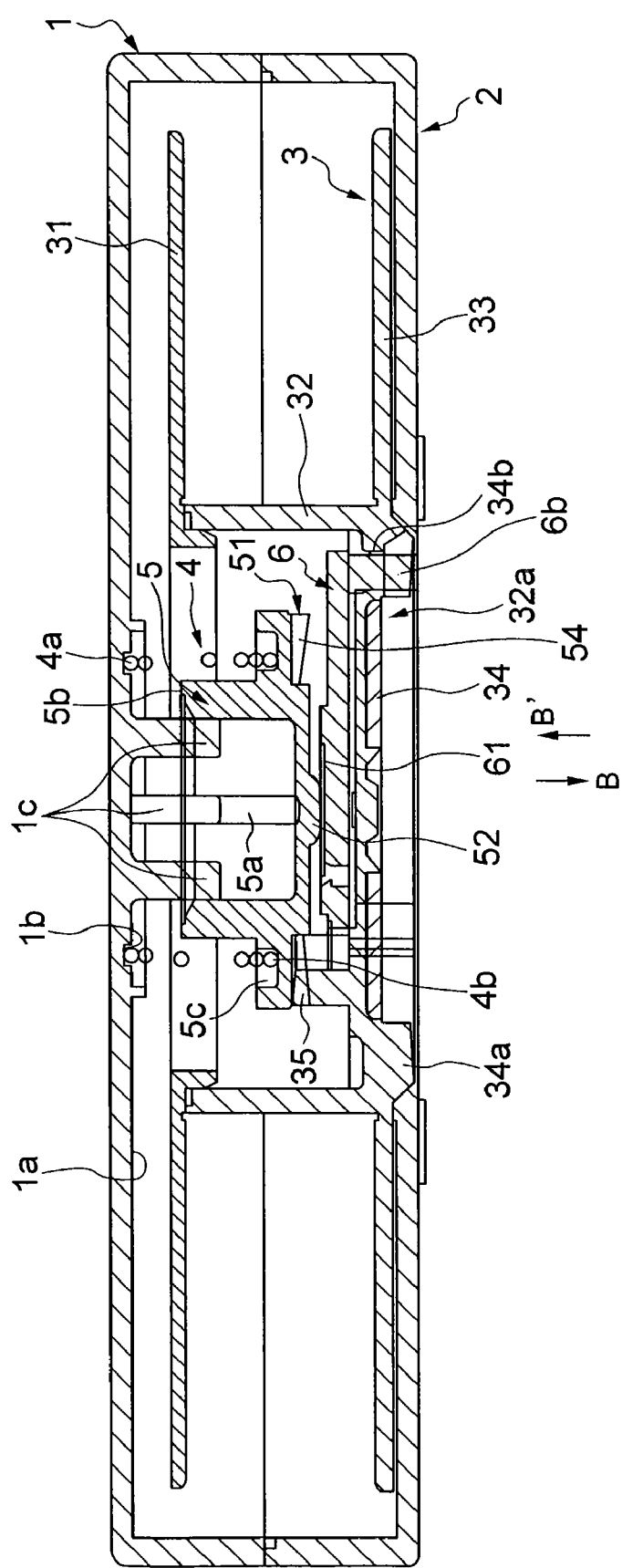
FIG. 2 is a vertical sectional view of the tape cartridge in FIG. 1, which shows a state where locking of the tape reel is released when the tape cartridge is not used.
Figure 3:
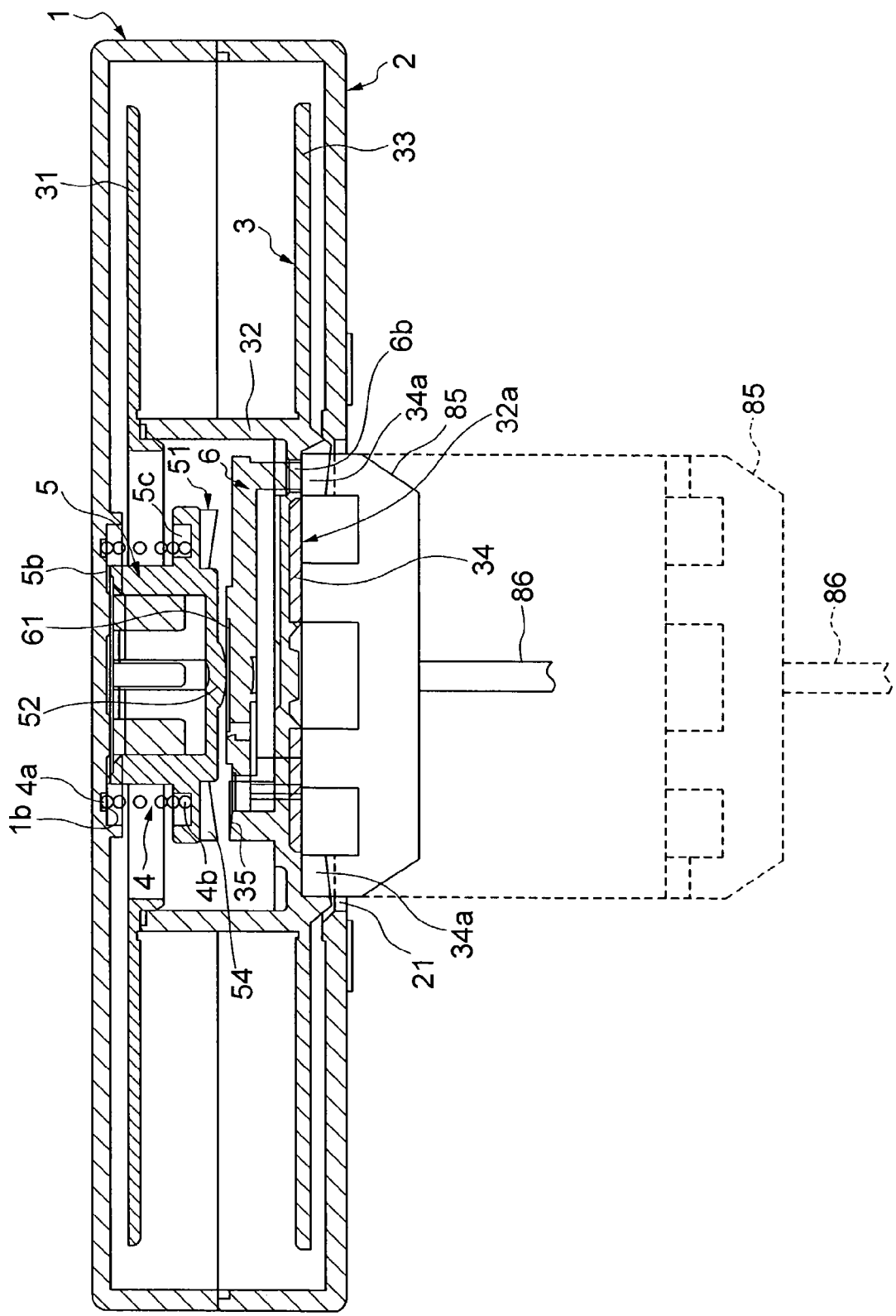
FIG. 3 is a vertical sectional view of the tape cartridge in FIG. 1, which shows a state where locking of the tape reel is released when the tape cartridge is used.

Hereinafter, description will be explained about embodiments of the present invention with reference to the accompanying drawings. FIG. 1 is an exploded view in perspective of a tape cartridge according to an aspect of the present invention. FIG. 2 is a vertical sectional view of the tape cartridge in FIG. 1, which shows a state where locking of the tape reel is released. FIG. 3 is also a vertical sectional view of the tape cartridge in FIG. 1, which shows a state where locking of the tape reel is released. Note that FIG. 1 also shows a perspective view of an upper case 1 and a hub portion 32 respectively seen from their backsides.

The tape cartridge in FIG. 1 is constituted in a rectangular and plane-shaped one-reel type manner, which is provided with the upper case 1 and a lower case 2. The tape cartridge has a tape reel 3 on which a magnetic recording tape being a tape-shaped recording medium (which is hereinafter sometimes merely called "tape") is wound at an inside of the tape cartridge. When mounted to a recording and reproducing apparatus, the tape cartridge is constructed so that the tape reel 3 can be rotated. The upper case 1 and the lower case 2 can be respectively produced by molding process using resin material.

The tape reel 3 is provided with an upper flange 31, a lower flange 33, and a hub portion which is formed integrally with the lower flange 33. And on a circumferential surface of the hub portion, a tape-shaped magnetic recording medium is wounded. Also, as shown in FIG. 1, a circle-shaped metal plate 34 made of soft magnetic material is provided integrally with a lower surface 32a of the hub portion 32. Engaging teeth 34a which engages with teeth portion of a driving member 85 (see FIG. 3) at the side of a recording and reproducing apparatus are provided at the periphery of the metal plate 34, which are divided into three sections in its circumferential direction. A plurality of holes 34b penetrate through the opposite surface to the lower surface 32a between the engaging teeth 34a. The metal plate 34, the engaging teeth 34a, and the plurality of holes 34b penetrate through a penetrating hole 21 of the lower case 2 to be exposed for an outside.

A teeth portion 35 is provided so as to be separated in its circumferential direction at a plurality of locations on a backside face of the lower surface 32a at an inside of the hub portion 32. Here, the teeth portion 35 has a large number of teeth 36 (see FIG. 5) which are mated and engaged with a teeth portion 51 of a brake-locking member 5 and which are arranged in a circle manner. The teeth portion 35 can be produced by molding process using resin material such as polycarbonate (PC) or the like. In this case, by mixing glass fiber into the resin material, its strength may be enhanced.

As shown in FIG. 1 and FIG. 2, the brake-locking member 5 is arranged at an inside of the hub portion 32. The large number of teeth 54 (see FIG. 5) are provided with the teeth portion 51 which is arranged in a circular manner; a cross-shaped engaging hole 5a being formed on an end surface of a cylinder whose diameter is smaller than the diameter of the teeth portion 51; an end portion 5b at the periphery of the cross-shaped hole 5a; and a ring-shaped groove 5c which is formed so that an end portion 4b of a brake-locking spring 4 is accommodated at a backside face of the teeth portion 51; so that the large number of teeth 54 are mated and engaged with the teeth portion 35 of the hub portion 32. The brake-locking member 5 can be produced by molding process using resin material such as polyacetal (POM) or the like.

The brake-locking member 5 is, as shown in FIG. 1 and FIG. 2, mounted to the upper case 1 so that a plurality of engaging projecting portions 1c being provided so as to be upright to an inner surface 1a of the upper case 1 are inserted into the cross-shaped hole 5a, so as to be movably engaged in a vertical direction of each of drawing papers of FIG. 1 and FIG. 2. A tip end 4a of the brake-locking spring 4 is fitted with ring-shaped grooves 1b of the inner surface 1a of the upper case 1. And the brake-locking spring 4 is located between the ring-shaped grooves 1b of the upper case 1 and the ring-shaped grooves 5c of the brake-locking member 5, and always biases against the brake lock member 5 in the direction of an arrow B in FIG. 2, so that the teeth portion 51 and the teeth portion 35 of the hub portion 32 are mutually mated and engaged, resulting in preventing the tape reel 3 from being rotated to establish a braking state.

A brake releasing member 6 is arranged between the hub portion 32 and the brake-locking member 5, which is provided with a main plate 6a and a plurality of leg portions 6b which are projected downwardly in FIG. 1 from a plurality of portions at the periphery of the main plate 6a. The plurality of leg portions 6b are inserted into a plurality of holes 34b at the lower surface of the hub portion 32. When the tape cartridge is mounted to the recording and reproducing apparatus, the leg portion 6b of the brake-releasing member 6 is lifted up upwardly by pushing them from below in FIG. 1. Thus, as shown in FIG. 3, the brake-locking portion 5 is, by way of a pressure equalizing plate 61 of the brake-locking member, lifted up upwardly against a biasing force of the brake-locking spring 4 at a center of a convex bearing portion 52 at the center, resulting in that the end portion 5b is moved to an unlocked location so as to approach to the inner surface 1a.

The tip end 83 (represented by a dotted line in FIG. 1) of the magnetic recording tape which is wounded on the tape reel 3 is fixed to leader members 8. In the leader members 8, the tip end 83 of the magnetic recording tape is wound on a pin member 81, and from above a C-shaped cramp 82 is fitted therewith to establish a fixing state. When the tape cartridge is mounted to the recording and reproducing apparatus, the leader members 8 are held using a holding member at the side of the apparatus, and drawn from a tape drawing opening 73 (see FIG. 1) to the side of the apparatus.

Further, the tape drawing opening 73 is opened and closed using a door member 7. The door member 7 is biased toward a direction where the tape drawing opening 73 is always closed.

Figure 4:
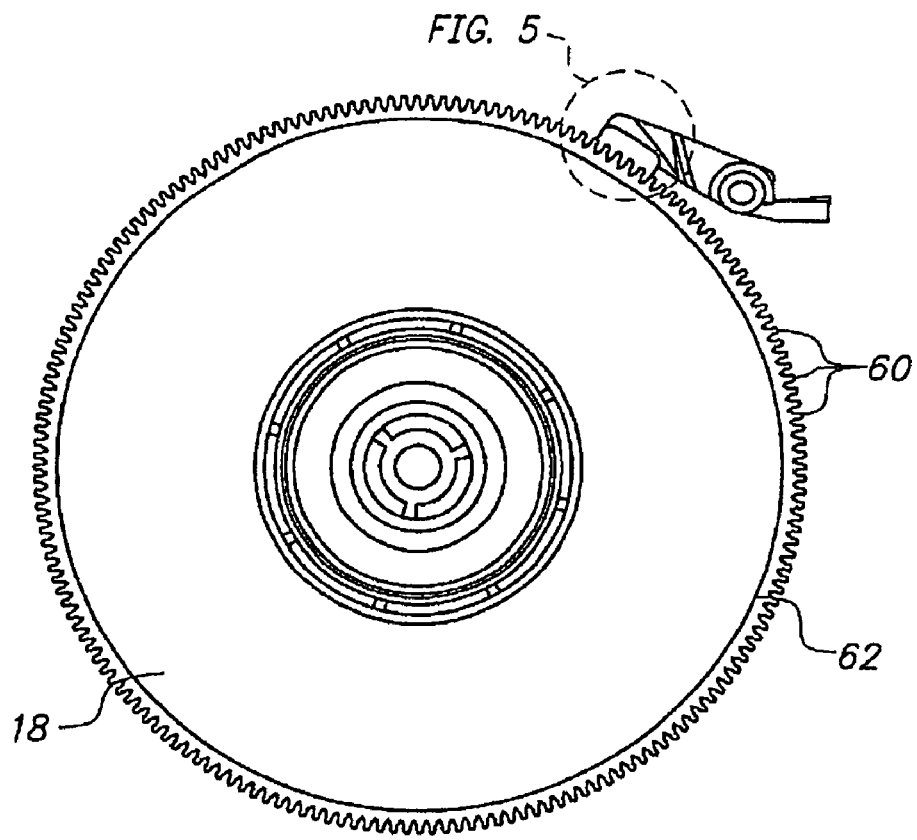
FIG. 4 is a plan view partially showing a large number of teeth by which the teeth portions of the brake-locking member are arranged in a circular manner, seen from a side of its bottom surface.

Next, description will be explained about a mating configuration among a large number of teeth which constitutes the teeth portion 51 and the teeth portion 35, referring to FIG. 4 and FIG. 5. FIG. 4 is a plan view partially showing a large number of teeth by which the teeth portions 51 of the brake-locking member 5 are arranged in a circular manner.

Figure 5:
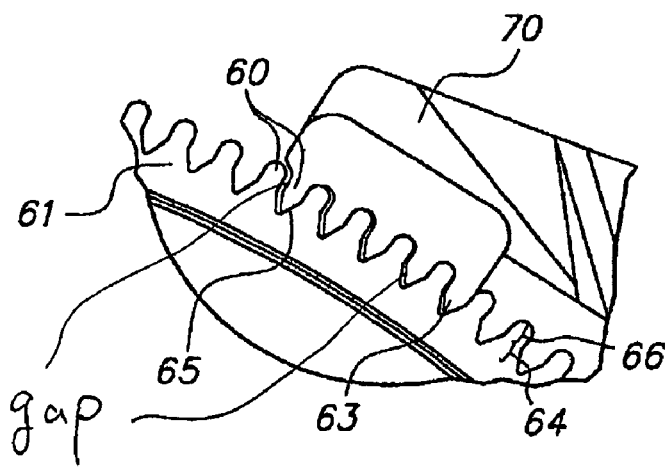
FIG. 5 is an elevational view partially showing the teeth constituting the teeth portion of the brake-locking member in FIG. 1 and the teeth portion of the hub of the tape reel.

FIG. 5 is an elevational view partially showing the teeth constituting the teeth portion 51 of the brake-locking member 5 and the teeth constituting the teeth portion 35 of the hub portion 32 of the tape reel 3, respectively.

As shown in FIG. 4, the teeth portion 51 of the brake-locking member 5 is constituted by the large number of teeth 54 which are formed along a circumferential portion of a circular surface 53 of the brake-locking member 5 (a surface facing to the side of the tape reel 3 in FIG. 2 and FIG. 3). Each of the teeth 54 is extended from the circumferential portion of the circular 53 toward a center p (see FIG. 4) in a radial manner and in a linear manner by a desired length, and formed at the entire circumferential portion, mutually having a constant pitch angle designated by θ. Also, a lateral surface of each of the teeth 54 is constituted so that the height of the lateral surface is gradually lower from the circumferential side of the circle surface 53 toward the center p (see FIG. 4) as shown in FIG. 2 and FIG. 3.

Further, the teeth portion 35 (see FIG. 1) being provided so as to be divided at an inside of the hub portion 32 of the tape reel 3 is constituted in a substantially same manner as the teeth portion 51 so as to be able to be mated with the teeth portion 51 in FIG. 4. At the time of the mating, the teeth 36 (see FIG. 5) constituting the teeth portion 35 is interposed between the teeth 54 and any other teeth 54.

As shown in FIG. 5, each of the teeth 54 of the teeth portion 51 of the brake-locking member 5 is formed in an approximately pentagonal shape, seen from a front portion at the circumferential side of a circular surface 53. In other words, each of the teeth 54 has a taper portion 55 and a vertical portion 56. The taper portion 55 is slanted at both sides from an apex portion which is a tip end 55a, and has substantially symmetrical shape with relative to an axis line in a longitudinal direction of drawing of FIG. 5. The vertical portion 56 is extended in a substantially vertical manner from both terminal ends 55b of the taper portion 55 toward a base portion 57.

Each of the teeth 36 at the side of the tape reel 3 is also formed in an approximately pentagonal shape. Likewise, each of the teeth 36 has a taper portion 37 and a vertical portion 38. The taper portion 37 is slanted at both sides from an apex portion which is a tip end 37a, and has substantially symmetrical shape with relative to an axis line in a longitudinal direction of drawing of FIG. 5. The vertical portion 38 is extended in a substantially vertical manner from both terminal ends 37b of the taper portion 37 toward a base portion 39.

When the teeth portion 51 is mated with the teeth portion 35, as represented by a double-dot line in FIG. 5, the teeth 54 of the teeth portion 51 is fitted with a gap between the teeth 36 and the other teeth 36 of the teeth portion 35 lying at the opposite side, and the tip end 55a is contacted on a bottom surface 39a of the base portion 39, while the teeth 36 of the teeth portion 35 is fitted with a gap between the teeth 54 and the other teeth 54, and the tip end 37a is contacted on a bottom surface 57a of the base portion 57. Then, the vertical portion 56 of the teeth 54 and the vertical portion 38 of the teeth 36 are partially opposed and contacted.

Further, as shown in FIG. 5, if the height from the base portion 57 of the teeth 54 to the tip end 55a is defined by H1, it is preferable that a height designated by H of the vertical direction from the base portion 57 to the terminal end 55b of the taper portion 55 is satisfied with following equation. Note that it is preferable that the teeth 36 is also satisfied with such a relationship.

$$0.6 \times H1 \leq H \leq 0.95 \times H1$$

According to the tape cartridge shown in FIG. 1 to FIG. 5, when the tape cartridge is not used, e.g. when the tape cartridge is preserved, the brake-locking member 5 is biased using the brake-locking spring 4 to be moved to a locking position as shown in FIG. 2. And each of the teeth 54 of the teeth portion 51 of the brake-locking member 5 and each of the teeth 36 of the teeth portion 35 of the hub portion 32 of the tape reel 3 are mutually mated and engaged as represented by the solid line and the two-dotted line in FIG. 5, resulting in that the tape reel 3 will lie in a braked state, i.e. cannot be rotated, so that an unexpected rotation can be prevented and the loosening of the magnetic recording tape can be prevented. Further, the vertical portion 56 of the teeth 54 and the vertical portion 38 of the teeth 36 are opposed and mutually contacted, resulting in that a state of mating of the teeth 54 at the side of the brake-locking member 5 with the teeth 36 at the side of the tape reel 3 becomes hard to become unfitted and an expected rotation can be securely prevented. Thus, because a function for preventing a tape from being loosened when the tape is preserved or the like, can be sufficiently performed, folding and/or jamming of a magnetic recording tape at inside of the case can be prevented in advance.

Further, even when the tape cartridge receives an impact at the time of dropping of the cartridge or the like, a state of mating between the teeth is hard to become unfitted, resulting in that the loosening of the magnetic recording tape is hard to occur. Further, as shown in below-mentioned FIG. 6, the height of each of the teeth 54 and the teeth 36 can be set to be lower.

Further, as above-mentioned, when the teeth 54 and the teeth 36 are about to be mutually mated by a biasing force of the brake-locking spring 4, the tip end 55a of each of the teeth 54 and the tip end 37a of each of the teeth 36 are respectively abutted on the taper portions 37, 55, simultaneously introduced and moved to a gap between the teeth and the other teeth, resulting in that the mating of the teeth with the opposite teeth can be readily and securely performed.

Further, at each of the taper portions 55, 37 and each of the vertical portions 56, 38, a sectional area of each of the teeth seen from FIG. 5 can be secured larger than conventional, so that the strength of the teeth can be enhanced. Particularly, more splendid strength can be obtained than conventional in the vicinity of the tip parts 55a, 37a of the taper portions 55, 37. Therefore, even when the tape cartridge receives a strong impact by its dropping or the like, breakage of the teeth is hard to occur.

Next, when the tape cartridge is mounted to the recording and reproducing apparatus, as shown in FIG. 3, the driving member 85 at the side of the apparatus and the tape cartridge relatively approaches each other, and the driving member 85 penetrates through the penetrating hole 21 of the lower case 2. Thereafter, when the driving member 85 magnetically absorbs the metal plate 34 made of soft magnetic material at the side of the lower surface 32a of the hub portion 32, the teeth portion of the driving member 85 is mated with the engaging teeth 34a of the hub portion 32. Further, the projecting portion of the teeth portion of the driving member 85 allows the brake-releasing member 6 to be moved in a direction of an arrow B' (which is opposite to the direction of the arrow B (see FIG. 2) using the leg portion 6b, resulting in that the brake-locking member 5 is moved against the biasing force of the brake-locking spring 4 by a constant stroke to arrive at a non-locked position as shown in FIG. 3, resulting in that there occurs a gap between the teeth portion 51 and the teeth portion 35 and then the mating state of the teeth portion 51 with the teeth portion 35 is released. Thus, the tape reel 3 can be rotated together with rotation of a driving axle 86 of the driving member 85.

Further, a door member 7 is opened by an opening member (unshown) at the side of the apparatus, the leader members 8 are held by the holding member at the side of the apparatus, and the magnetic recording tape is drawn toward the side of the apparatus, resulting in that recording or reproducing of the magnetic tape becomes possible.

Next, description will be explained about a gap between the teeth portion 51 and the teeth portion 35 in the tape cartridge shown in FIG. 1 to FIG. 5, referring to FIG. 6.

Figure 6:
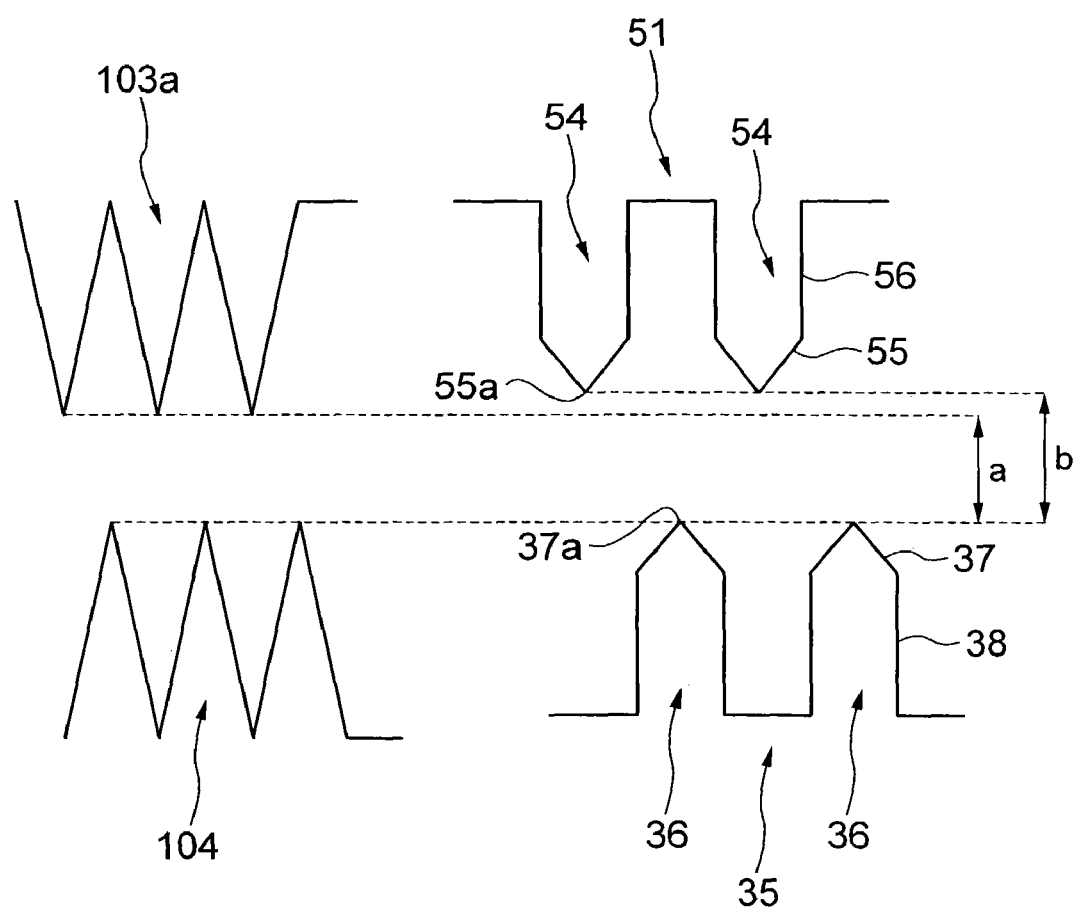
FIG. 6 is a view showing a gap formed between tip parts of each of the teeth at the time of releasing the mating state of the teeth when the tape cartridge in FIG. 1 is used, comparing such a gap with a gap formed in the conventional art.
Figure 11A:
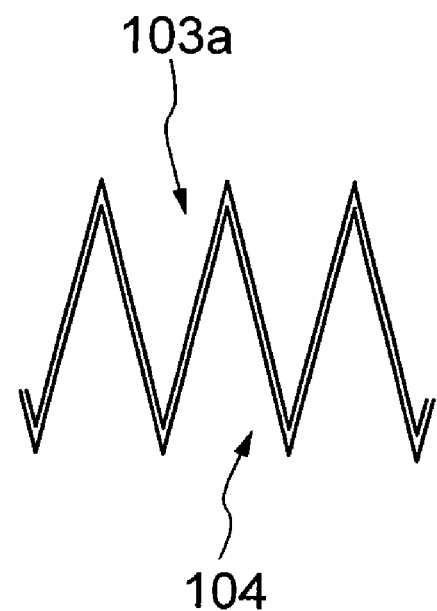
FIG. 11A is a partial elevational view showing a state where the teeth portion of the tape reel side and the teeth portion of the braking lock member side are mutually mated, in the conventional tape cartridge.
Figure 11B:
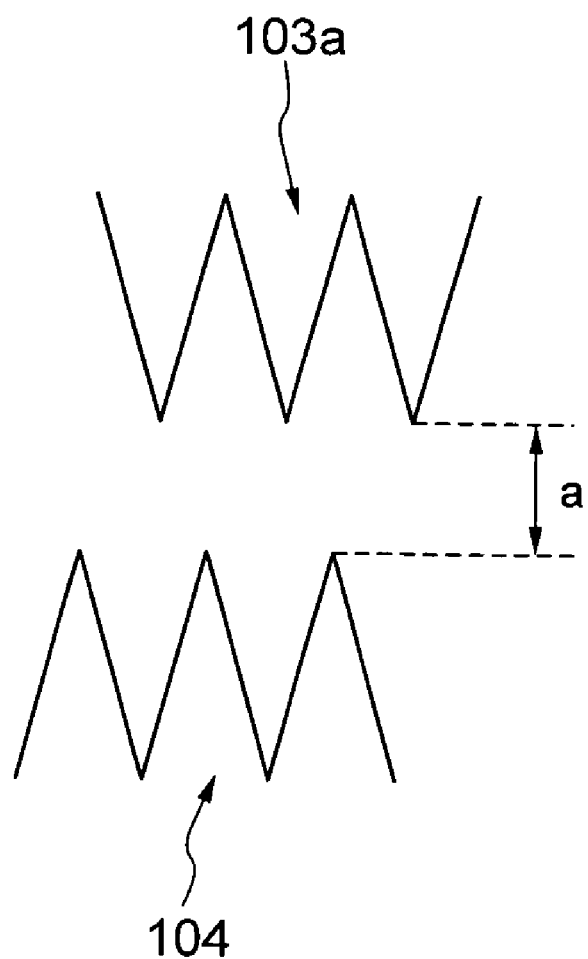
FIG. 11B is a partial elevational view showing a state where such a mating state is released.

FIG. 6 is a view showing a gap formed between the tip part 55a of each of the teeth 54 of the teeth portion 51 and the tip part 37a of each of the teeth 36 of the teeth portion 35 at the time of releasing the mating state of the teeth when the tape cartridge is used, comparing such a gap with the gap formed in the conventional art in FIG. 11B.

As above-mentioned, the tape cartridge is mounted to the recording and reproducing apparatus; the brake-locking member 5 is moved by a desired stroke; the mating state is released; and the tape reel 3 can be rotated. Then, as shown in FIG. 6, a gap b between the tip end 55a of each of the teeth 54 of the teeth portion 51 and the tip end 37a of each of the teeth 36 of the teeth portion 35 is set to be larger than the gap a in the conventional configuration shown in FIG. 11B and the heights of each of the teeth 54, 36 are configurated to be lower while the moved stroke by the brake-locking member 5 is constant.

While the tape reel 3 is being rotated, the brake-locking member 5, as shown in FIG. 3 and FIG. 4, is biased by and contacted with the brake-releasing member 6 using the brake-locking spring 4 at the convex bearing portion 52 located at the center portion. Even if the brake-locking member 5 is inclined by receiving an affection based on pressure balance of the brake-locking spring 4, as shown in FIG. 6, the gap b between the teeth 54 and the teeth 36 is larger than conventional. Thus, contact between the teeth 54 at the side of the brake-locking member 5 and the teeth 36 at the side of the rotating tape reel 3 can be securely avoided. And an operational defect is hard to occur based on the contact between the teeth, and further an error operation can be securely avoided at the time of reproducing and/or recording information. Thereby, reliability can be enhanced while the tape reel 3 is being rotated.

As above-mentioned, even if height of each of the teeth 54 and the teeth 36 is set to be lower in order to securely widen the gap b between the teeth 54 and the teeth 36 when the tape cartridge is used, the mating state of each of the teeth 54 at the side of the brake-locking member 5 with each of the teeth 36 at the side of the tape reel 3 is hard to become unfitted when the tape cartridge is not used, by the mating configuration of the teeth 54 with the teeth 36 at the taper portion and the vertical portion and further the sectional areas of the teeth 54 and the teeth 36 are larger, resulting in that there does not occur any problem to be caused by such a configuration that height of each of the teeth 54 and the teeth 36 is set to be lower.

Further, even if the bearing portion 52 used for the brake-locking member 5 and the brake-releasing member 6 are contacted and worn in a biased state while the tape reel 3 is rotating, as above-mentioned, the gap b between the teeth 54 and the teeth 36 is large, resulting in that allowance degree against a worn amount becomes more, so that less problem occur as conventional.

Additionally, a pitch between the teeth may be made to be large in order to enhance strength of the teeth in such a conventional configuration as shown in FIG. 11A. According to this configuration, the loosening of the tape occurs when the teeth are mated with the opposite teeth and the tape is tensioned and extended. On the other hand, a span of the pitch may be made to be narrow, in other words, an angle of tip part of each of the teeth may be made to be more acute so that the mating of the teeth with the opposite teeth becomes hard to be unfitted, and the loosening, the pulling, and the extension of the tape are prevented. According to this conventional configuration, especially a portion at the vicinity of the tip end is thin thereby having a weak configuration in its strength. However, according to the teeth configuration of the present embodiment, strength of the teeth can be secured, and further the securing state of a sufficient span of the gap between the teeth when the tape cartridge is used can be secured and the loosening of the tape can be securely prevented.

Next, description will be explained about a modified example of the teeth configuration in which the height H of a vertical portion of each of the teeth is altered, referring to FIG. 7 and FIG. 8. FIG. 7 is an elevational view illustrating a modified example of a teeth construction in which the height H at a vertical portion of each of the teeth is set so as to be somewhat lower in a same way as shown in FIG. 5. FIG. 8 is an elevational view illustrating another modified example of a teeth construction in which the height H at a vertical portion of each of the teeth is set so as to be somewhat higher in a same way as shown in FIG. 5.

In the example of FIG. 7, the height H of the vertical portion 56 is set to be somewhat lower. However, it is preferable that the height H is equal to or 60% higher than the entire height H1 of each of the teeth 54. This relationship can be applied to the teeth 36. Thus, in the opposing portions c at the vertical portions 56, 38, the opposing areas can be secured, resulting in that it can be prevented that the mating of the teeth with the opposite teeth is unfitted when the tape cartridge is not used.

Further, in the example of FIG. 8, the height H of the vertical portion 56 is set to be somewhat higher. Here, it is preferable that the height H is not 95% higher than the entire height H1 of the teeth 54. This relationship can be also applied to the teeth 36. Thereby, at opposing portions d at the vertical portions 56, 38 in FIG. 8, the opposing areas can be secured so as to be larger than those in the case of FIG. 7 while inclined angles can be secured to some extend at the taper portions 55, 37, resulting in that a guide effect can be performed by the taper portions.

As above-mentioned, the present invention has been explained together with the embodiments. However, the present invention is not limited to them. Namely, various modifications can be carried out without departing from the scope of technical idea of the present invention.

For example, the tape cartridge is not limited to the one-reel typed one. Needless to say, any other type of a tape cartridge can be applied thereto.

Figure 9:
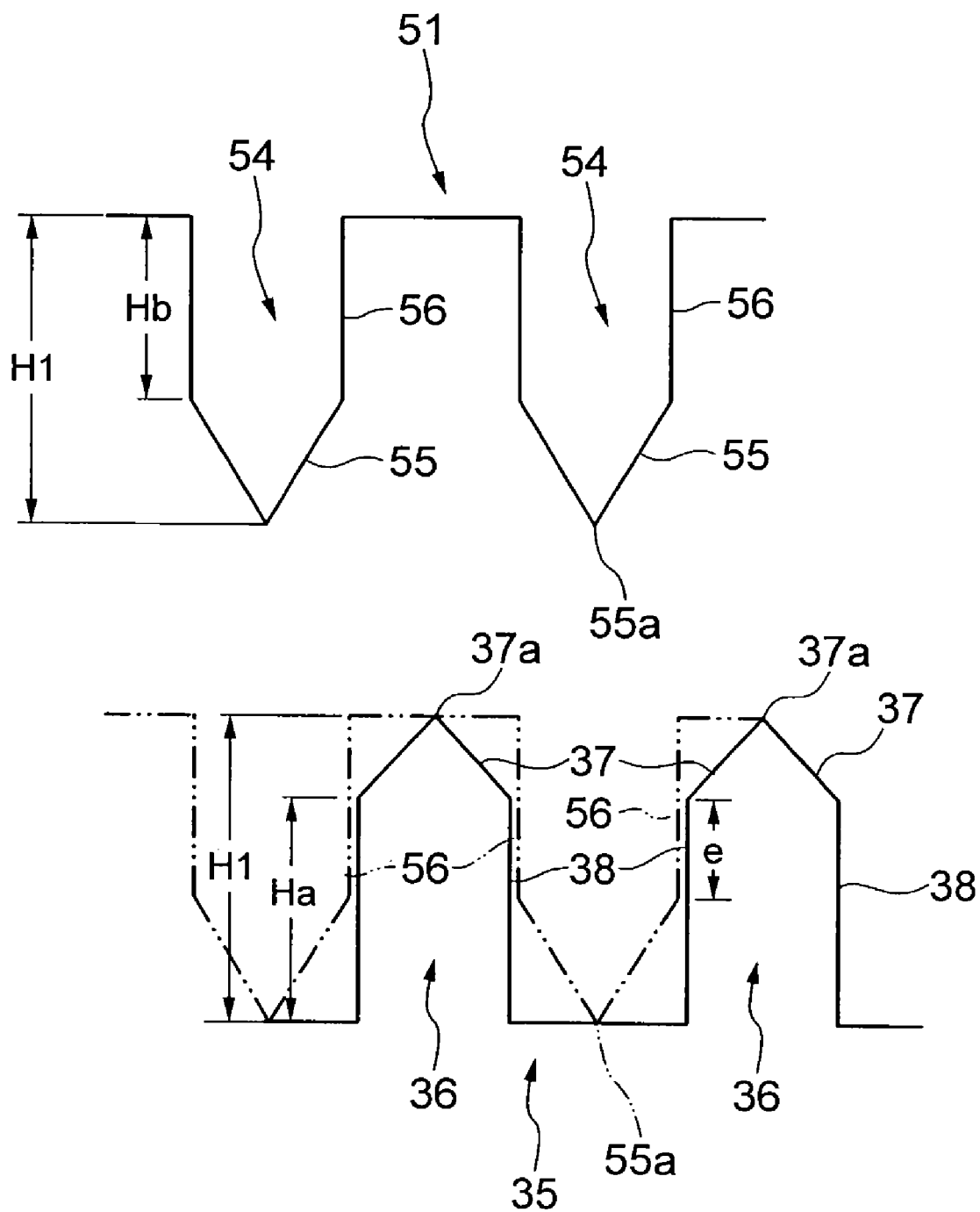
FIG. 9 is an elevational view showing further another modified example of a teeth construction in which a height H at a vertical portion of each of the teeth construction is changed using a teeth portion 35 and a teeth portion 51 in a same way as shown in FIG. 5.
Figure 10:
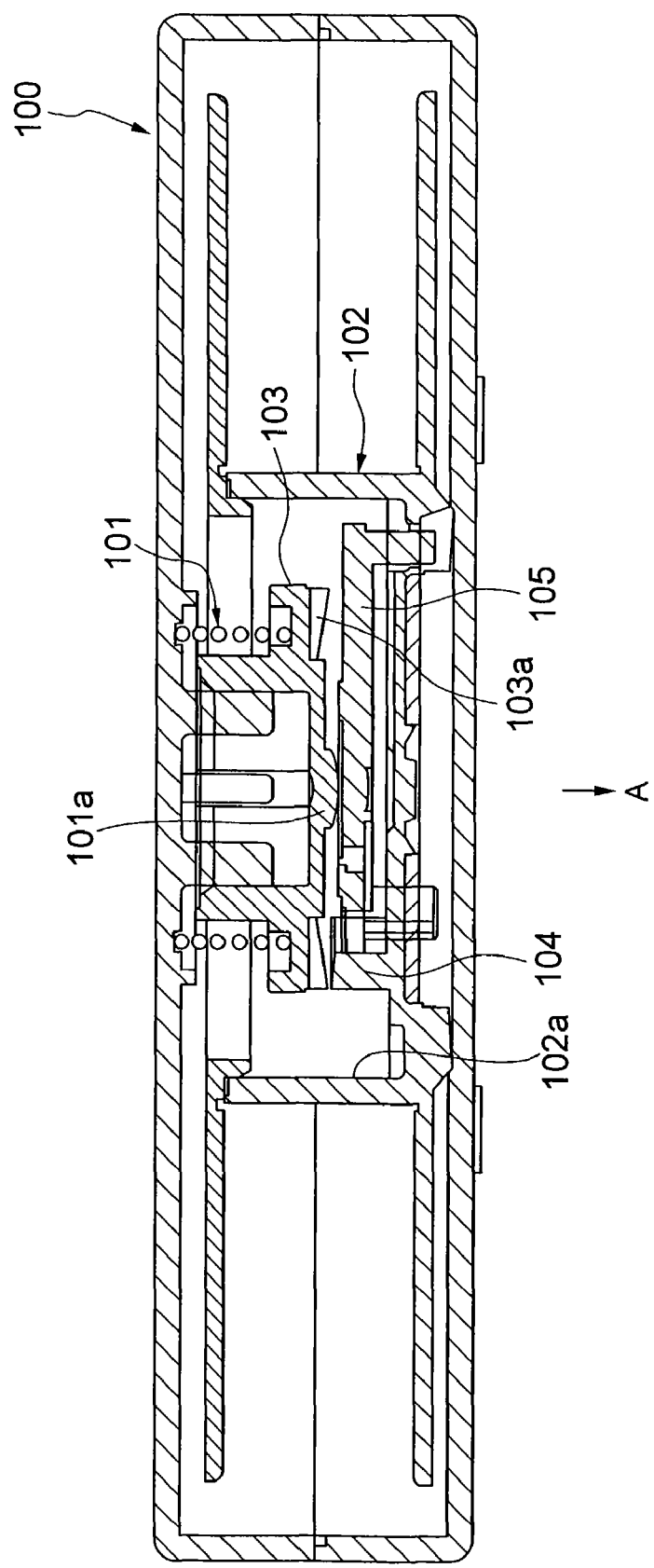
FIG. 10 is a vertical sectional view of a tape cartridge of the conventional one-reel-typed tape cartridge.

Further, the configurations in FIG. 5, FIG. 7, and FIG. 8 are set so that height H of the vertical portion 38 of the teeth 36 is equal to height H of the vertical portion 56 of the teeth 54. The present invention is not limited to these configurations. For example, a configuration is set so that the heights H1 of the teeth 36, 54 are constant while the heights of the vertical portions 38, 56 are not equal. FIG. 9 is an elevational view illustrating further another modified example of a teeth construction in which height Ha at a vertical portion of each of the teeth construction is changed by a teeth portion 35 and a teeth portion 51 in a same way as shown in FIG. 5. In an example of FIG. 9, the height Ha of the vertical portion 38 of the teeth 35 at the side of the tape reel 3 is set to be somewhat lower than height Hb of the vertical portion 56 of the teeth portion 51 at the side of the brake-locking member 5. According to this configuration, opposing areas can be secured at opposing portions e while a guide effect can be performed at apex portions of the tip parts at the taper portions 55, 37.

Further, FIGS. 12A to 12D show modifications of shaping of each of teeth. In FIG. 5, and FIGS. 7 to 9, the tip part of each of the teeth is formed at its apex, and abutted on a base portion in a point contacting state. However, in an example of FIG. 12A, a flat portion 91 is provided at a tip part of each of the teeth. When the teeth are mated with the opposing teeth, the flat portion 91 is abutted on the bottom surfaces 39a, 57a (see FIG. 5) of the base portion of the opposing teeth portion in a linear contacting state or in a plane contacting state. Note that in this case, the flat portion may be slightly inclined as represented by a dotted line so that an apex 91a is contacted on the base portion in a point contacting state.

Figure 12A:
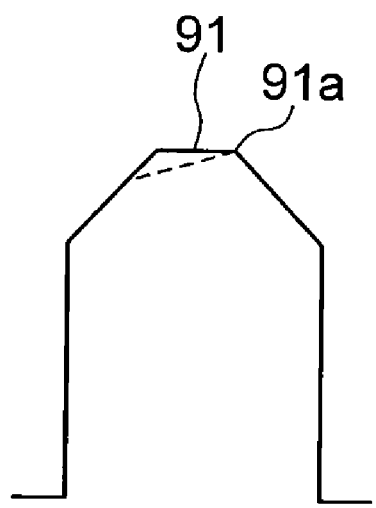
FIGS. 12A, 12B, 12C, and 12D respectively show further modified examples of the teeth configuration.
Figure 12B:
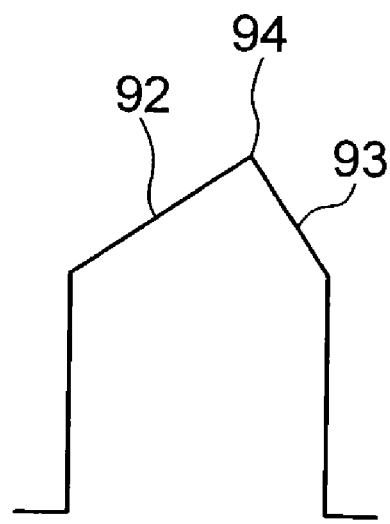

In the example of FIG. 12B, the configuration is constituted so that a taper portion 92 and a taper portion 93 of each of the teeth are not symmetrical with respect to a longitudinal direction axis line from a tip part 94 to the base portions 39, 57 (see FIG. 5). In this case, the tip end 94 may be formed in a flat manner as shown in FIG. 12A.

Figure 12C:
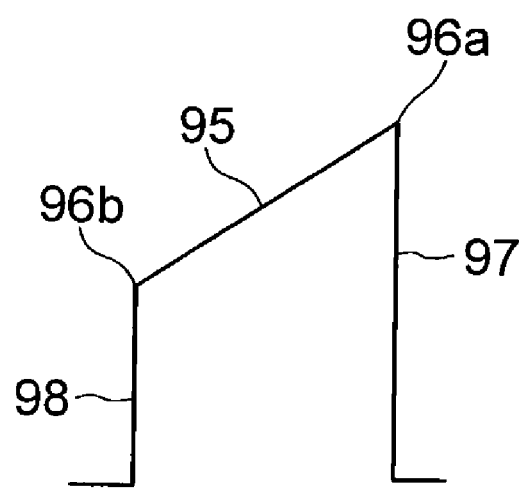
Figure 12D:
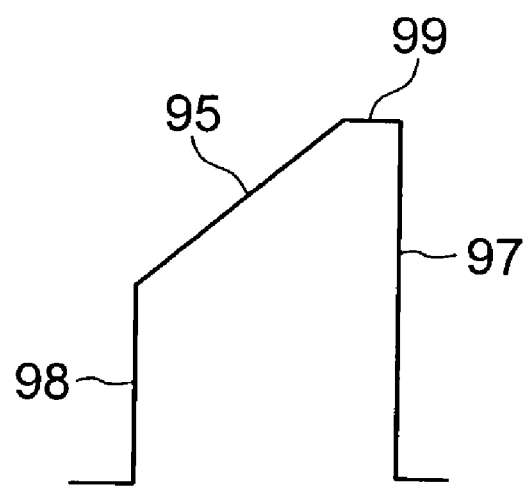

In the example of FIG. 12C, the configuration is constituted so that a taper portion 95 of each of the teeth is inclined from one of the both ends of the tip part 96a, and a vertical portion 97 is extended from a tip part 96a to the bases 39, 57 (see FIG. 5). And the configuration is constituted so that the vertical portion 98 from a terminal end 96b of the taper portion 95 is extended to the base portions 39, 57 (see FIG. 5). In this case, the tip part 96a may be provided with a flat portion 99 as shown in FIG. 12D.

Figure 13:
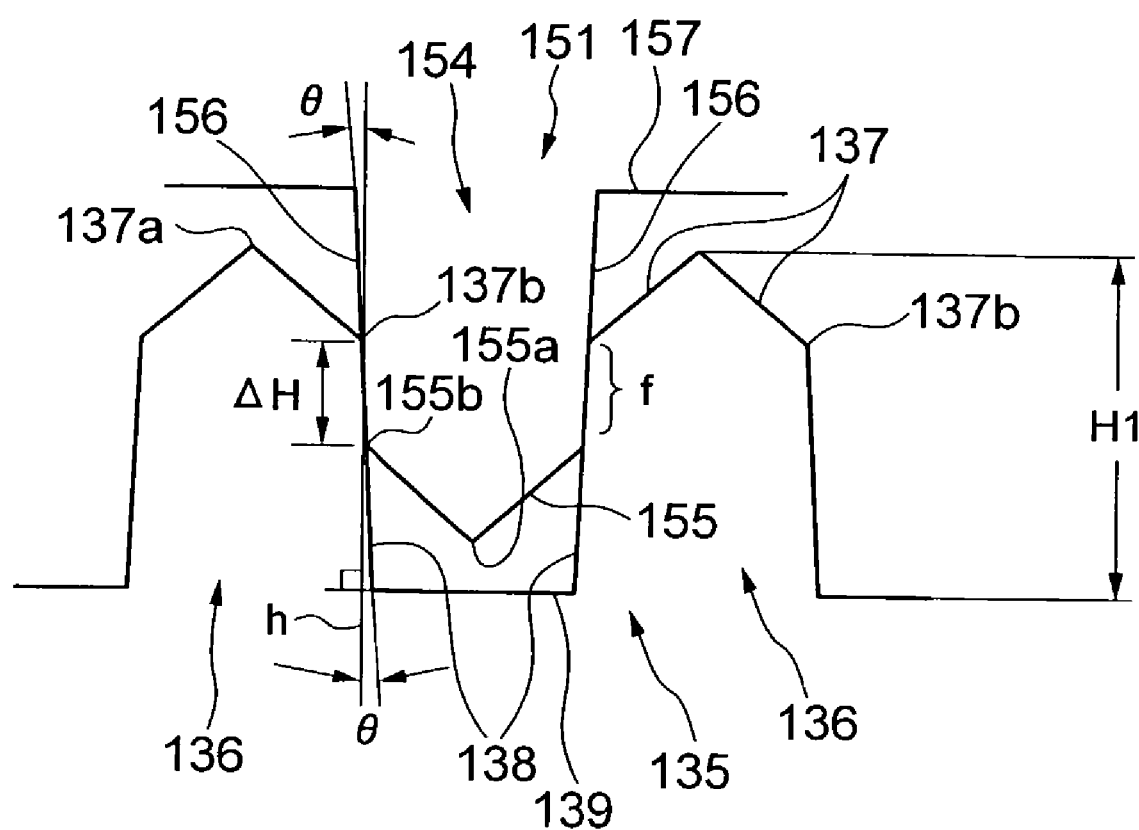
FIG. 13 shows an elevational view showing a further modified example of the teeth configuration.

Further, FIG. 13 shows further modified example of shape of each of the teeth. The example of FIG. 13 is made so that a vertical portion of each of the teeth is slightly inclined to the base portion, and the mutual tip parts are not contacted with a bottom surface of the base portion at the opposite side while the vertical portions are mutually contacted. A vertical portion 138 of a tooth 136 of a teeth portion 135 is inclined by an angle θ with relative to a vertical line h from a terminal portion 137b of a taper portion 137 toward a base portion 139. Likewise, a vertical portion 156 of a tooth 154 of a teeth portion 151 is inclined by an angle θ with relative to a vertical line h from a terminal portion 155b of a taper portion 155 toward a base portion 157. Owing to the inclination, when the teeth portion 135 is mated with the teeth portion 151, the vertical portion 138 of the tooth 136 is contacted with the vertical portion 156 of the tooth 154 while the tip part 137a of the tooth 136 and the tip part 155a of the tooth 136 are not respectively contacted with the bottom surfaces of the base portions 139, 157.

Further, in FIG. 13, it is preferable that a contacting height (projected height of the vertical line h) ΔH at an opposing and contacting portion f between the vertical portions 138, 156 is greater than or equal to 20% and less than or equal to 90% of the entire length H1 of each of the tooth 136 and the tooth 154. Thereby, the opposing areas can be sufficiently secured at the opposing and contacting portion f. Further, for example, the inclination angle θ can be set by 1 to 2 degrees.

Further, at the time of mating of the teeth with the opposite teeth, the tooth 136 of the teeth portion 135 and the tooth 154 of the teeth portion 151 need not to be mutually mated over all the mating portions in the circumferential direction. Namely, such a mating state has only to be established at a mere part of the mating portions therein.

According to the tape cartridge of the present embodiment, when the tape cartridge is not used, the mating state of the teeth at the side of the brake-locking member with the teeth at the side of the tape reel is hard to be unfitted, resulting in that unexpected rotation of the tape reel can be securely prevented, the loosening of the tape is hard to occur, and the strength of the teeth can be enhanced.

Further, a gap between the teeth at the side of the tape reel and the teeth at the side of the brake-locking member can be secured so as to be as wide as possible, resulting in that the contact between the teeth at the side of the tape reel and the teeth at the side of the brake-locking member can be securely prevented, so that an error operation can be prevented.

What is claimed is:

1. A tape cartridge comprising:
    a tape reel which is rotatably housed;
    a tape-shaped recording medium wound around the tape reel;
    a reel teeth portion disposed on the tape reel; and
    a brake-locking member having a brake teeth portion disposed coaxially and selectively mated with the reel teeth portion wherein when the reel teeth portion and the brake teeth portion are mated a rotation of the tape reel is prevented and the tape cartridge is not used, and rotation of the tape reel is possible when the reel teeth portion and the brake teeth portion are not mated and the tape cartridge is used;
    wherein the reel teeth portion and the brake teeth portion respectively have a plurality of teeth projected from a base portion,
    each of said teeth comprising:
    a tip part;
    a taper portion comprising:
        a first taper portion inclined toward at least one direction from the tip part of the teeth to at least one terminal; and
        a second taper portion inclined toward at least another direction from the tip part of the teeth to at least one terminal; vertical portions comprising:
        a first vertical portion extending in a substantially vertical manner from the terminal of the first taper portion to the base portion; and
        a second vertical portion extending in a substantially vertical manner from the terminal of the second taper portion to the base portion; and
    at least one portion of each of said teeth is constituted so that the first vertical portion of each of the teeth of the reel teeth portion contacts the first vertical portion of each of the teeth of the brake teeth portion when the reel teeth portion and the brake teeth portion are mated and at least another portion of each of said teeth is constituted so that the second vertical portion of each of the teeth of the reel teeth portion contacts the second vertical portion of different teeth of the brake teeth portion when the reel teeth portion and the brake teeth portion are mated.

2. The tape cartridge according to claim 1, wherein the teeth of the reel teeth portion and the brake teeth portion are circularly arranged.

3. The tape cartridge according to claim 1, wherein the tip part of each of the teeth comprises one of an apex and a flat portion.

4. The tape cartridge according to claim 1, wherein the tip part of one of the reel teeth and the brake teeth contacts a bottom surface of the base portion of an opposite tooth of the tip part.

5. The tape cartridge according to claim 4, wherein a height H (a distance from the base portion to the end terminal of the taper portion) of the vertical portion is satisfied with the following equation, provided that a height of each of said teeth from said base portion to said tip part is defined by H1:

$$0.6 \times H1 \leq H \leq 0.95 \times H1.$$

6. The tape cartridge according to claim 1, wherein upon the mating, the tip part is not contacted with a bottom surface of the base portion at the opposite tooth while the vertical portion is contacted with the vertical portion at the opposite tooth.

7. The tape cartridge according to claim 6, wherein a contact height $\Delta H$ at a mutually contacting portion between said vertical portions is satisfied with following equation, provided that a height from said base portion to the tip part is defined by H1:

$$0.2 \times H1 \leq \Delta H \leq 0.9 \times H1.$$

8. A tape cartridge comprising:
a tape reel around which a tape-shaped recording medium is wound, which is rotatably housed, and which has a reel teeth portion; and
a brake-locking member having a brake teeth portion coaxially disposed with and capable of being mated with the reel teeth and releasing the mating state so that rotation of the tape reel is prevented when the tape cartridge is not used, and is possible when the tape cartridge is used, respectively;
wherein the reel teeth portion and the brake teeth portion respectively have a plurality of teeth projected from a base portion,
each of said teeth having a first taper portion which is inclined toward at least one direction from a tip part of the teeth, a second taper portion which is inclined toward at least another direction from the tip part, a first vertical portion extending in a substantially vertical manner from an end terminal of the first taper portion to the base portion, and a second vertical portion extending in a substantially vertical manner from an end terminal of the second taper portion to the base portion, and
at least one portion of each of said teeth is constituted so that the first vertical portion contacts the first vertical portion of opposing teeth upon the mating and at least another portion of each of said teeth is constituted so that the second vertical portion contacts the second vertical portion of different opposing teeth upon the mating.

9. The tape cartridge according to claim 2, wherein the tip part of each of the teeth is comprises one of an apex and a flat portion.

10. The tape cartridge according to claim 2, wherein the tip part of one of the reel teeth and the break teeth contacts a bottom surface of the base portion of an opposite tooth of the tip part.

11. The tape cartridge according to claim 10, wherein a height H (a distance from the base portion to the end terminal of the taper portion) of the vertical portion is satisfied with the following equation, provided that a height of each of said teeth from said base portion to said tip part is defined by H1:

$$0.6 \times H1 \leq H \leq 0.95 \times H1.$$

12. The tape cartridge according to claim 2, wherein upon the mating, the tip part is not contacted with a bottom surface of the base portion at the opposite tooth while the vertical portion is contacted with the vertical portion at the opposite tooth.

13. The tape cartridge according to claim 12, wherein a contact height $\Delta H$ at a mutually contacting portion between said vertical portions is satisfied with following equation, provided that a height from said base portion to the tip part is defined by H1:

$$0.2 \times H1 \leq \Delta H \leq 0.9 \times H1.$$

14. The tape cartridge according to claim 2, wherein the teeth of the reel teeth portion and the brake teeth portion are circularly arranged.

* * * * *